United States Patent [19]
Chien et al.

[11] Patent Number: 5,815,667
[45] Date of Patent: Sep. 29, 1998

[54] CIRCUITS AND METHODS FOR INTELLIGENT ACKNOWLEDGEMENT BASED FLOW CONTROL IN A PROCESSING SYSTEM NETWORK

[75] Inventors: Anthony H. Chien; Jeffrey M. Donnelly, both of Holmdel, N.J.

[73] Assignee: NCR Corporation, Dayton, Ohio

[21] Appl. No.: 563,477

[22] Filed: Nov. 28, 1995

[51] Int. Cl.⁶ ................................................. G06F 13/00
[52] U.S. Cl. ............................ 395/200.62; 395/200.54; 370/229
[58] Field of Search ................ 395/200.01, 200.06, 395/200.13, 200.3, 200.54, 200.55, 200.62, 200.63, 200.64, 200.65, 200.11; 370/229, 230, 231, 232, 233, 234, 235, 236

[56] References Cited

U.S. PATENT DOCUMENTS

| | | | |
|---|---|---|---|
| 4,654,654 | 3/1987 | Butler et al. | 340/825.5 |
| 4,771,391 | 9/1988 | Blasbalg | 364/514 C |
| 5,042,029 | 8/1991 | Hayakawa | 370/231 |
| 5,103,446 | 4/1992 | Fischer | 370/236 |
| 5,193,151 | 3/1993 | Jain | 395/200.06 |
| 5,245,616 | 9/1993 | Olson | 371/32 |
| 5,276,677 | 1/1994 | Ramamurthy et al. | 370/232 |
| 5,315,587 | 5/1994 | Kullander | 370/235 |
| 5,367,523 | 11/1994 | Chang et al. | 370/235 |
| 5,400,329 | 3/1995 | Tokura et al. | 370/232 |
| 5,418,912 | 5/1995 | Christenson | 395/200.13 |
| 5,572,674 | 11/1996 | Ernst | 395/200.1 |
| 5,612,949 | 3/1997 | Bennett | 370/253 |
| 5,627,970 | 5/1997 | Keshav | 395/200.13 |
| 5,631,935 | 5/1997 | Ginossar | 375/377 |
| 5,633,861 | 5/1997 | Hanson et al. | 370/232 |

*Primary Examiner*—Tod R. Swann
*Assistant Examiner*—Conley B. King, Jr.
*Attorney, Agent, or Firm*—William A. Munck

[57] ABSTRACT

The present invention is directed, in general, to network connectivity, and more specifically to circuits and methods for intelligent acknowledgment-based flow control in a processing system network. The present invention concerns governing transmission of data packets and reception indicia by a transmission circuit over a network. Detector circuitry is included and is operative to (1) monitor a first latency characteristic of the network that is indicative, at least in part, of a utilization level of the network; and (2) monitor a second latency characteristic indicative, at least in part, of an efficiency level associated with transmission of the reception indicia by the transmission circuit. Control circuit is further included and is associated with the detector circuitry and the transmission circuit. The control circuit is operative to (1) adjust a retransmission delay of the transmission circuit of the data packets over the network as a function of the first latency characteristic, thereby allowing the management circuit to manage the retransmission delay as a function of the utilization level of said network; and (2) adjust a transmission delay of the transmission circuit of the reception indicia over the network as a function of the second latency characteristic to thereby allow the management circuit to manage the transmission delay as a function of the efficiency level associated with the transmission circuit.

29 Claims, 6 Drawing Sheets

PRIOR ART
FIG. 3
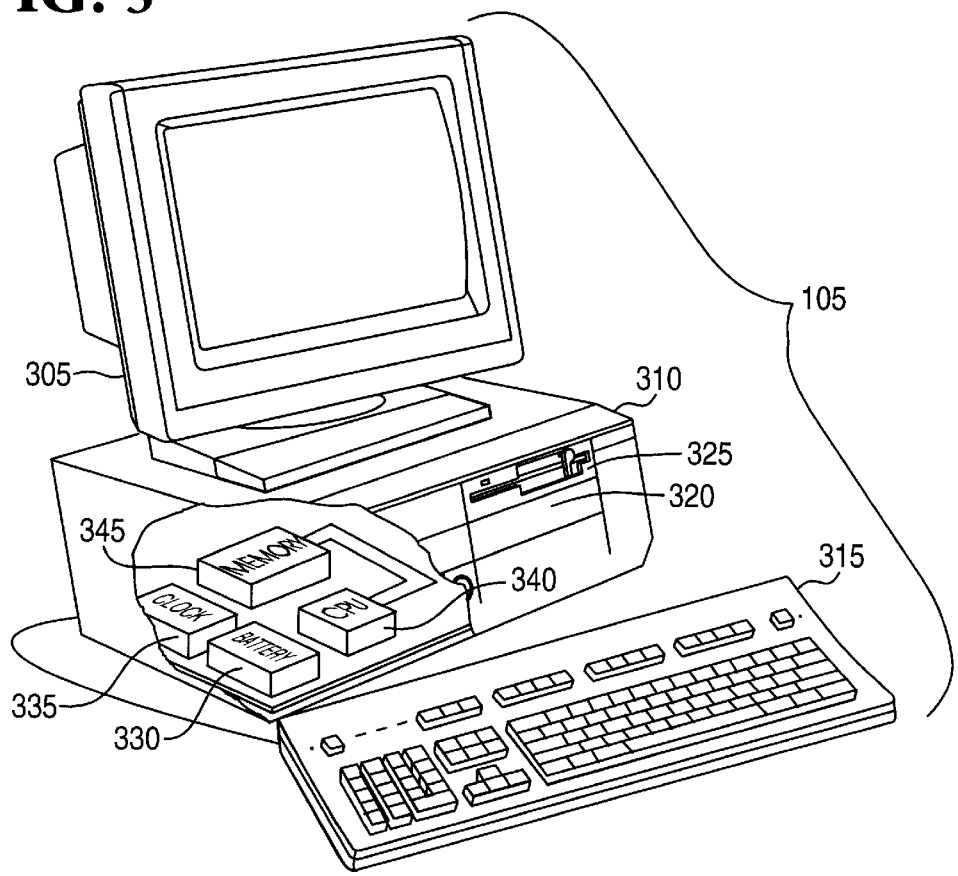
PRIOR ART
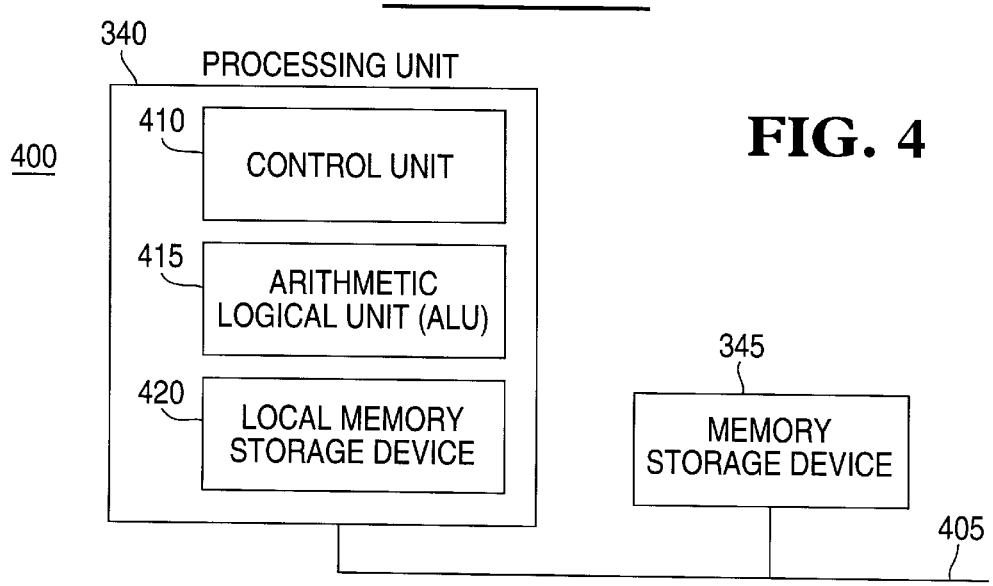
FIG. 4

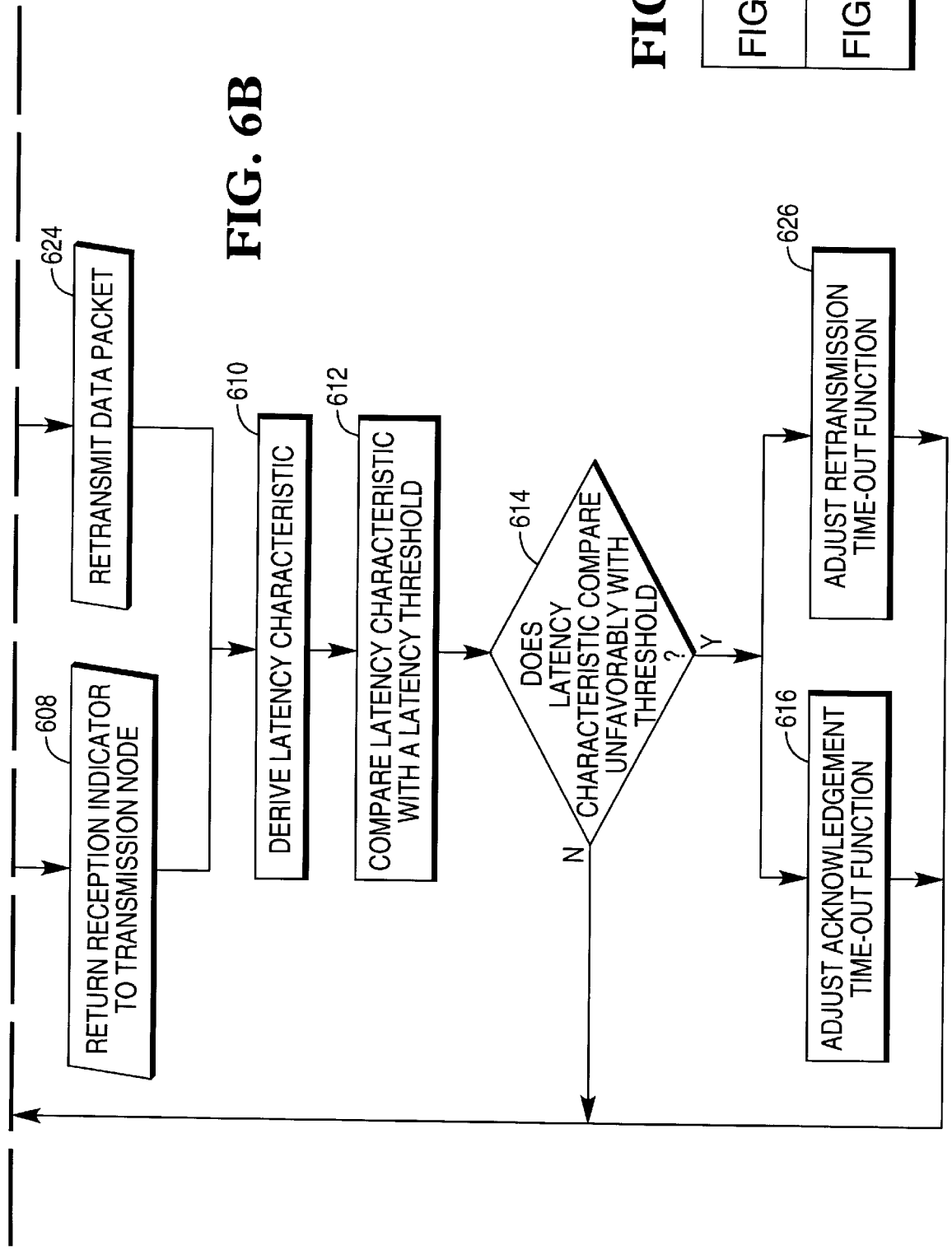

CIRCUITS AND METHODS FOR INTELLIGENT ACKNOWLEDGEMENT BASED FLOW CONTROL IN A PROCESSING SYSTEM NETWORK

TECHNICAL FIELD OF THE INVENTION

The present invention is directed, in general, to network connectivity, and more specifically to circuits and methods for intelligent acknowledgment-based flow control in processing system networks.

BACKGROUND OF THE INVENTION

A processing system network, such as a computer network or a communications network, is a combination of two or more independent nodes that are capable of communicating with one another over a communications channel, path or link. A node may be an independent processing system, such as a conventional computer, or another processing system network.

Nodes communicate with one another in order to share resources, such as databases and data files, software applications, hardware peripherals and communication links. Communication links are shared to enable two or more nodes that are not directly linked together to communicate through one or more intermediate nodes. Resource sharing generally involves the transference of large amounts of data. The data is typically divided into packets, frames, groups, etc. ("data packets"). Each data packet includes data and information necessary to route the same between two or more nodes.

Networks traditionally belong in one of two general categories, namely, local area networks ("LANs") and wide area networks ("WANs"). A LAN is a group of communicating nodes that are located relatively close to one another, such as within the same building or building complex. A WAN, on the other hand, is a collection of independent and distinct network nodes that cooperate over relatively long distances. Communication links between WAN nodes are routinely provided by third-party carriers, such as by long-distance telephone companies. Gateways, such as routers, bridges or other suitable network portal devices, are used to couple LANs and WANs together (i.e., LAN-to-LAN, LAN-to-WAN and WAN-to-WAN). The conventional approach is to use the gateway as a junction point through which data packets received from a source network are routed to one or more destination networks. Gateways typically include control circuitry and a memory. The memory often includes the routing address for each LAN and each WAN coupled to the gateway, and also often includes the address of one or more of the nodes of each of the LANs and WANs. In the event that a particular node is itself a LAN or a WAN, the addresses of one or more of its nodes are also frequently stored in the memory.

Communication between networks and nodes involves level operations. Level operations include data traffic flow control, sequencing, transmission error detection and correction, and the like. For example, consider three serially coupled networks (i.e., Network A, Network B and Network C) in which one or more data packets are transmitted from a Network A node to a Network C node. By definition, the data packets pass, like a baton in a relay race, from Network A to Network B to Network C until the same reaches a destination node. The destination node processes the received packets to determine whether they were correctly received. In response thereto, the destination node typically returns either an "ACK" signal, meaning that the transmission was received without error, or a "NAK" signal, meaning that the transmission was corrupt. In the event that the transmitting node receives an ACK signal, it typically purges the previously transmitted data packets from its transmission queue. Alternatively, if it receives a NAK signal, the transmitting node retransmits at least one of the one or more data packets to the destination node.

Timers are typically used to verify the occurrence of an event within a prescribed time period, such as the reception of one or more data packets. When the transmission node transmits a data packet, it starts a transmission timer that is set to expire if the destination node fails to respond in the form of an ACK or a NAK signal within a set period. Upon expiration, the transmission is reattempted and the transmission timer is reset. A common problem with transmission timer values however is that they fail to account for increases and decreases in network traffic (i.e., channel utilization). As traffic increases, timeouts tend to occur too soon. Conversely, as traffic decreases, timeouts tend to occur too late. A further problem associated with destination nodes, is that after returning an ACK, they are often required to return one or more data packets to the transmission node. In other words, after processing the received data packets, the destination node transmits one or more resulting data packets to the transmission node thereby increasing overall network traffic.

A solution to this latter identified problem is to delay return of a positive acknowledgment for a sufficient period for the destination node to process the received data packets, and to "piggyback" the ACK on a data packet to be returned. Typically, when the destination node receives a data packet, it starts an acknowledgment timer that is set to expire if the destination node fails to generate a return data packet within a set period. Upon expiration, the destination node transmits the ACK signal. A common problem with acknowledgment timers is that they fail to account for series of data packets that are received at the destination node that do not generate return data. In other words, the acknowledgment timer tends to timeout repeatedly, unnecessarily delaying transmission of the ACK signal to the transmission node. Unfortunately, these repeated timeouts, when coupled with moderate to heavy traffic over a network, will slow down the transmission mode and may increase the occurrence of transmission timeouts and unnecessary retransmissions.

There accordingly exists a need in the art to effectively limit the occurrence of acknowledgment-based timeouts, particularly, those timeouts resulting from increased network traffic. There exists a further need in the art to more efficiently retransmit lost data packet transmissions that occur during intervals of decreased network traffic. There exists a still further need in the art to identify series of received data packets that will likely not return data to a transmitting node, and to suitably modify acknowledgment timers to more efficiently acknowledge data packet reception.

SUMMARY OF THE INVENTION

To address the above-discussed deficiencies of the prior art, it is an object of the present invention to dynamically and adaptively improve the efficiency of data packet transference. In the attainment of the above-identified object, the present invention provides circuits and methods for intelligent acknowledgment-based flow control in a processing system network. An exemplary processing system network in accordance with the present invention includes an infrastructure operative to couple a plurality of nodes together and to enable selectively ones of the same to communicate.

An exemplary management circuit for governing transmission of a reception indicia by a transmission circuit over the network includes detector and control circuits. The detector circuit is operative to monitor a latency characteristic that is indicative, at least in part, of an efficiency level associated with transmission of the reception indicia by the transmission circuit. The control circuit is associated with the detector and transmission circuits, and is operative to adjust a transmission delay associated with the transmission of the reception indica over the network as a function of the latency characteristic. In accordance with the foregoing, the management circuit is thereby allowed to manage the transmission delay as a function of the efficiency level associated with the transmission circuit.

In an alternate embodiment, the transmission delay represents an elapsed interval or period of time measured with respect to a received data packet. In other embodiments, the control circuit is further operative to compare the transmission delay a with a threshold and to derive the latency characteristic as a function of the comparison. In still further embodiments, the control circuit is further operative to compare the latency characteristic with some other threshold.

An exemplary management circuit for governing transmission of data packets by a packet transmission circuit over a network includes detector and retransmission control circuits. The detector circuit is associated with the network and is operative to monitor a latency characteristic of the network. The latency characteristic is indicative, at least in part, of a utilization level of the network. The retransmission control circuit is associated with the detector and packet transmission circuits, and is operative to adjust a retransmission delay of the packet transmission circuit of the data packets over the network as a function of the latency characteristic. In accordance with the foregoing, the management circuit is thereby allowed to manage the retransmission delay as a function of the utilization level of the network.

In an alternate embodiment, the retransmission control circuit is disabled in response to a received positive acknowledgment and the packet transmission circuit is enabled to retransmit the data packets over the network in response to a negative acknowledgment. In other embodiments, the retransmission control circuit is also operative to compare the retransmission delay with a threshold and to derive the latency characteristic as a function of the comparison. In still further embodiments, the retransmission control circuit is further operative to compare the latency characteristic with some other threshold.

An important aspect of the foregoing exemplary embodiments is that the same may suitably be associated with any suitable node or gateway in accordance with the principles of the present invention. Another important aspect is that any node, gateway and, more particularly, any circuit in accordance with the present invention may suitably be hardware-, firmware- or processing system-based.

The principles of the present invention, as illustrated by the foregoing embodiments, may also suitably be implemented in accordance with method steps, and in particular, as software. An exemplary software embodiment includes a plurality of instructions stored to a conventional storage medium. The instructions are readable and executable by a suitable processors. The instructions, upon execution, operate to control the processor to route data packets through a processing system network in accordance with the present invention. Preferred storage media include without limitation, magnetic, optic, and semiconductor, as well as suitable combinations thereof. A preferred software embodiment for governing transmission of reception indicia by a transmission circuit forms a portion of AT&T's STAR-GROUP LAN Manager for UNIX—OSI Transport Version, which is available from AT&T GLOBAL, INFORMATION SOLUTIONS in Dayton, Ohio.

The foregoing has outlined rather broadly a number of features and technical advantages of the present invention so that those skilled in the art may better understand the Detailed Description of the invention that follows. Additional features and advantages of the invention will be described hereinafter that, in conjunction with the foregoing, form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings in which like numbers designate like parts, and in which:

FIG. 3 illustrates an isometric view of an exemplary conventional processing system capable of functioning as a node within a processing system network that may be associated with a suitable implementation of the principles of the present invention;

FIG. 4 illustrates a block diagram of an exemplary conventional microprocessing system that may suitably be implemented in the processing system of FIG. 3 and that may be associated with a suitable implementation of the present invention;

FIG. 6A and 6B illustrate a flow diagram for performing intelligent acknowledgment-based flow control in accordance with the principles of the present invention.

DETAILED DESCRIPTION

Figure 1:
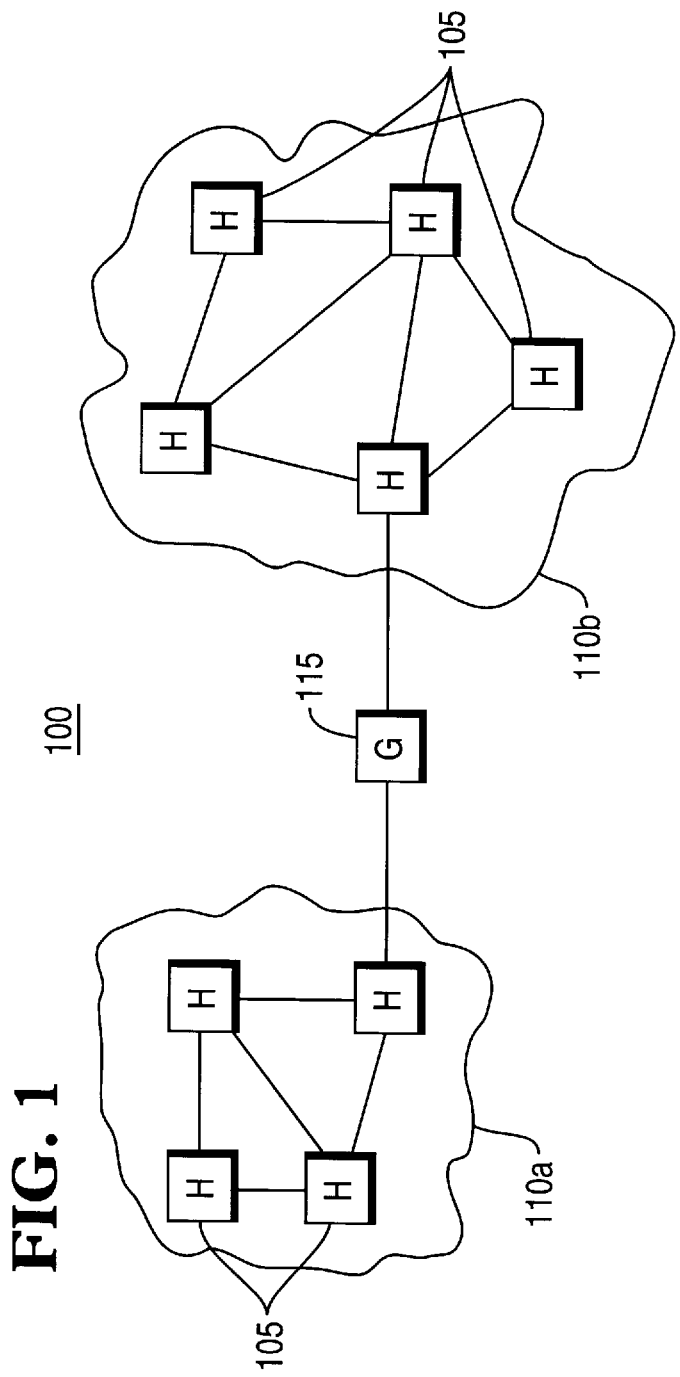
FIG. 1 illustrates a block diagram of the architectural structure of an exemplary TCP/IP network with which the principles of the present invention may be utilized.

FIG. 1 illustrates a block diagram of the architectural structure of an exemplary network 100 with which the principles of the present invention may be utilized; TCP/IP. The acronym "TCP/IP" represents Transport Control Protocol/Internet Protocol. TCP/IP is a known set of protocols developed to link dissimilar computers across many kinds of networks. TCP/IP is used herein for illustrative purposes only. In point of fact, the principles of the present invention may be implemented in accordance with any suitable acknowledgment-based data packet transmission scheme, including Open Systems Interconnect ("OSI"), X.25, and the like. "Include," as the term is used herein, means to "include without limitation."

Exemplary network 100 includes a plurality of interconnected nodes 105. A first set of nodes 105 form a first sub-network 110a, while a second set of nodes 105 form a second sub-network 110b. Exemplary sub-networks 110 are coupled via an exemplary gateway 115 (i.e., router, bridge or other suitable portal device). "Or" as used herein means "and/or." Gateway 115 may suitably be one of a core gateway or a non-core gateway. A core gateway includes information about the structure of network 100, whereas a non-core gateway includes limited or incomplete routing information, i.e., knowledge regarding one or more routes to a core gateway, but no knowledge about routing beyond the same.

Core gateways typically store routing information in one or more routing tables. Each node 105 is required only to know a specific route to its local gateway 115. A data packet transmitted between two remotely located nodes is accordingly passed from one gateway to another until the same reaches a destination node.

A routing table may suitably be programmer defined or developed dynamically (i.e., gateway queries neighboring gateways or the like for routing information). A given gateway may suitably include routing information for directly attached networks and general knowledge for routing traffic to remote networks. If a gateway cannot resolve a particular routing address, it broadcasts a request seeking assistance concerning the same to other gateways. According to the illustrated embodiment, any of exemplary nodes 105 or gateway 115 may include management circuitry (not shown) for governing transmission of data packets and a reception indicia over network 100 according to the principles of the present invention, which are discussed in detail hereinafter.

In general, as a data packet is forwarded between locations spanning a plurality of sub-network environments, it is processed to determine the address of its destination location or, possibly, intermediate locations. In response thereto, the data packet is suitably encased or wrapped in a data envelope. The data envelope, such as a file transfer protocol frame, typically includes a header having routing and transmission information. A TCP header, for example, provides end-to-end transmission confirmation or acknowledgment.

Figure 2:
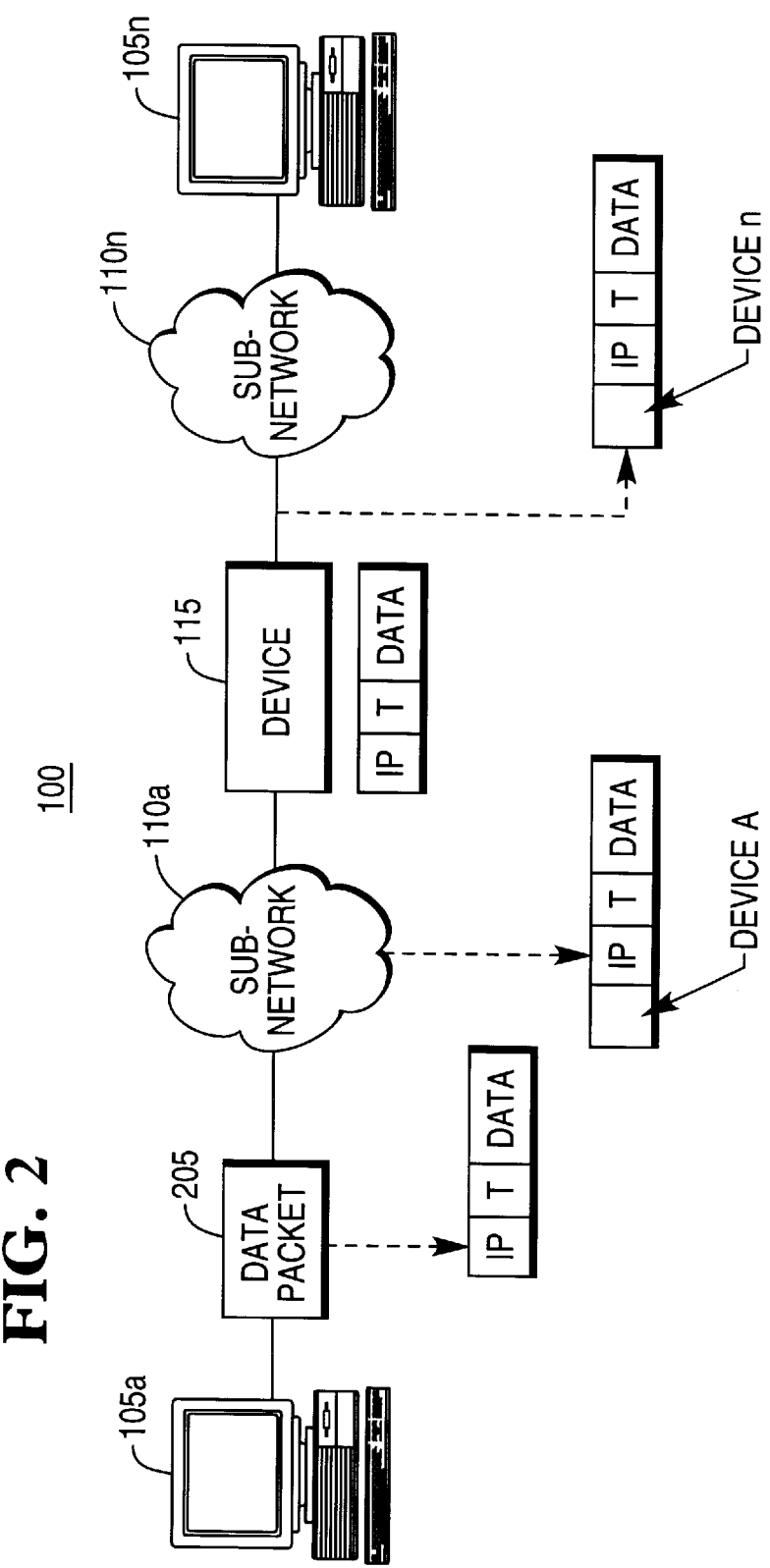
FIG. 2 illustrates a block diagram for routing one or more data packets between first and second locations in another exemplary processing system network according to the principles of the present invention.

FIG. 2 illustrates a block diagram for routing one or more data packets between first and second locations in an exemplary TCP/IP network 100 in accordance with the present invention. Exemplary network 100 includes a plurality of nodes 105, each of which is coupled locally to a suitable sub-network 110. A first node 105a, operating as an IP host, transmits an exemplary data packet 205 to a destination node 105n using an IP addressing scheme.

A first sub-network 110a processes data packet 205 and determines that destination node 105n is not local. In response thereto, an IP header is added to data packet 205. The IP header includes a global IP address for a second sub-network 110n. Gateway 115 routes data packet 205 based on the address of second sub-network 110n. Second sub-network 110n determines if the address of destination node 105n is local or remote. If the same is local, as illustrated, the data envelope is stripped off and data packet 205 is routed to destination node 105n.

In the event that destination node 105n was not local, network 110n would suitably determine the address of the next network element and add its address to the existing IP data packet. When that element received the data envelope containing the IP data packet, it would strip off the header designating its own address, and go through the same process as the previous network did, determining whether the destination address was local, and if not, packaging the IP data packet within another addressing header for the next network element. This process would continue until the data packet was finally routed to the destination address.

In the illustrated embodiment, first node 105a is further operative to retransmit data packet 205 in response to a transmission timeout. A "timeout," as the term is used herein, includes any suitable comparison between a threshold and a timer or clock value that yields a particular result. Destination node 105n is operative in accordance with TCP to verify and, preferably, correct received data packet 205, if necessary and possible. If correct, destination node 105n returns an acknowledgment signal to first node 105a, otherwise it may suitably return a negative acknowledgment.

Destination node 105n is also preferably operative to suitably use an acknowledgment timer to measure an interval of elapsed time with respect to the reception of data packet 205. "Measure," as used herein, includes compare, count, equate, evaluate, gauge, survey, quantify, weigh or the like. In the event that the processing data packet 205 generates or results in one or more data packets to be returned to first node 105a, destination node piggy-backs an acknowledgment, such as an ACK, to at least one return data packet. Destination node 105n is preferably further operative to transmit the acknowledgment alone to first node 105a in response to an acknowledgment timeout.

Exemplary transmission timer values may suitably depend, without limitation, upon one or more of the following:

(a) round trip propagation delay of the signal (usually a small value, except for very long and very high-speed circuits);

(b) processing time at the receiver (including queuing time of the data packet);

(c) transmission time of the acknowledging signal or frame; or (d) possible queue and processing time at the transmitter when it receives the acknowledgment.

Recall that heavy network traffic may delay receipt of the acknowledgment signal by first node 105b, thereby causing a timeout and retransmission of data packet 205. First node 105a is operative in accordance with the illustrated embodiment to monitor the frequency of transmission timeout occurrences. If the same compares unfavorably with a threshold, then first node 105a is preferably operative to modify the timeout function (e.g., change the timeout threshold, slow the timer or clock, etc.), temporarily disable the timeout function, temporarily disable the acknowledgment requirement, or the like. "Disable," as the term is used herein, includes detach, disassociate, disconnect, disengage, impair, incapacitate, separate or the like. An important aspect of the illustrated embodiment is the improved efficiency of data packet transference.

Destination node 105n is operative in accordance with the illustrated embodiment to monitor the frequency of acknowledgment timeout occurrences. If the same compares unfavorably with a threshold, then destination node 105n is preferably operative to modify the timeout function (e.g., change the timeout threshold, slow the timer or clock, etc.), temporarily disable the timeout function, temporarily disable the acknowledgment requirement, or the like. Another important aspect of the illustrated embodiment is the improved efficiency of acknowledgment transference.

FIG. 3 illustrates an isometric view of an exemplary conventional processing system 105. Processing system 105 is capable of functioning as a node within either of the exemplary processing system networks of FIG. 1 or 2. Processing system 105 includes a monitor 305, a housing 310 and a keyboard 315.

Housing 310 includes a hard disk drive 320 and a floppy disk drive 325. Hard disk drive 320 is suitable to provide fast access storage and retrieval. Floppy disk drive 325 is operative to receive, read or write to external disks, and may suitably be replaced by or combined with other conventional structures for transferring data or instructions, including tape and compact disc drives, telephony systems and devices (including telephone, video phone, facsimile or the like), message paging, network communication ports and the like.

Housing 310 is partially cut-away to illustrate a battery 330, a clock 335, a processor 340 and a detached local memory 345, all of which are suitably housed therein. Although processing system 105 is illustrated having a single processor, a single hard disk drive and a single local memory, processing system 105 may suitably be equipped with any multitude or combination of processors or storage devices. Processing system 105 may, in point of fact, be replaced by, or combined with, any suitable processing system operative in accordance with the principles of the present invention, including video phones, telephones, televisions, pagers, sophisticated calculators, and hand-held, laptop/notebook, mini, mainframe and super computers, as well as processing system network combinations of the same.

Conventional processing system architecture is more fully discussed in Computer Organization and Architecture, by William Stallings, MacMillan Publishing Co. (3rd ed. 1993); conventional processing system network design is more fully discussed in Data Network Design, by Darren L. Spohn, McGraw-Hill, Inc. (1993); and conventional data communications is more fully discussed in Data Communications Principles, by R. D. Gitlin, J. F. Hayes and S. B. Weinstein, Plenum Press (1992) and in The Irwin Handbook of Telecommunications, by James Harry Green, Irwin Professional Publishing (2nd ed. 1992). Each of the foregoing publications is incorporated herein by reference.

FIG. 4 illustrates a block diagram of an exemplary conventional microprocessing system 400 that may suitably be implemented in processing system 105 of FIG. 3. Microprocessing system 400 includes a processor 340 coupled via data bus 405 with a detached local memory 345. Memory 345 is operative to store data or instructions, which processor 340 is operative to retrieve and execute.

Processor 340 includes a control unit 410, an arithmetic and logic unit ("ALU") 415, and a internal memory 420 (e.g., stackable cache, a plurality of registers, etc.). Control unit 410 is suitably operative to fetch ones of the instructions from memory 345. ALU 415 is suitably operative to perform a plurality of operations, such as addition and Boolean AND, needed to carry out those instructions. Internal memory 420 is suitably operative to provide local high speed storage used to store temporary results and control information.

Figure 5:
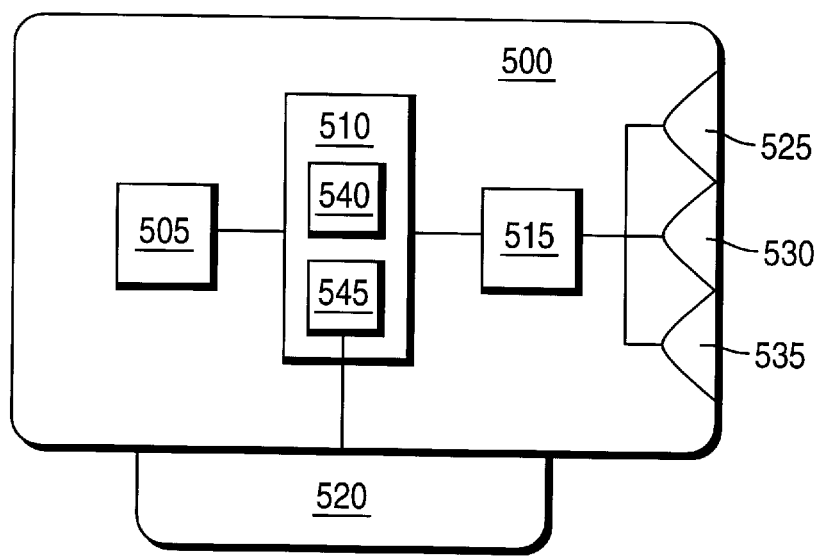
FIG. 5 illustrates a high-level block diagram of an exemplary network interface in accordance with the principles of the present invention.

FIG. 5 illustrates a high-level block diagram of an exemplary network interface 500 (e.g., a modem card, a FDDI card, a Ethernet card, etc.) in accordance with the principles of the present invention. Interface 500 includes an illustrative memory 505, a management circuit 510, a transmission circuit 515, an illustrative expansion bus connector 520, an illustrative connector for twisted-pair wire 525, an illustrative coaxial cable connector 530, and an illustrative transceiver connector 535. Management circuit 510 includes detector circuitry 540 and control circuitry 545.

Interface 500 may suitably be coupled with exemplary processing system 105 of FIG. 3. Management circuit 510 is operative to govern transmission of one or more of a plurality of data packets, as well as reception indicia, such as ACKs and NAKs, by transmission circuit 515 over a network, such as network 100 of FIGS. 1 and 2.

Detector circuitry 540 is operative to monitor a first latency characteristic of the network. The first latency characteristic is indicative or representative of, at least in part, a utilization level of the network. The utilization level of the network is important with respect to data packet transmission, in general, and to data packet retransmission, more specifically. As has been discussed herein, the threshold associated with a transmission timer is critical to efficient retransmission. Detector circuitry 540 is further operative to monitor a second latency characteristic. The second latency characteristic is indicative of, at least in part, an efficiency level associated with transmission of the reception indicia by transmission circuit 515. The efficiency level associated with the transmission of the reception indicia is important with respect to data packet acknowledgment, in general, and to positive acknowledgment and ACK piggybacking, more specifically. As discussed above, the threshold associated with an acknowledgment timer is critical to efficient data packet acknowledgment.

Control circuitry 545 is associated with both detector circuitry 540 and transmission circuit 515. Control circuitry 545 is operative to suitably adjust a retransmission delay associated with transmission of the data packets over the network. The retransmission delay is the time interval between transmission and subsequent retransmission of one or more data packets. The adjustment is performed as a function of the first latency characteristic. This suitably enables or allows management circuit 510 to manage the retransmission delay as a function of the utilization level of the network.

Control circuitry 545 is further operative to suitably adjust a transmission delay associated with transmission of the reception indica over the network. The transmission delay is the time interval between reception of a data packet and the eventual transmission of the reception indicia without piggybacking a return data packet. The adjustment is performed as a function of the second latency characteristic. This suitably enables management circuit 510 to manage the transmission delay as a function of the efficiency level associated with transmission circuit 515.

In performing either of the two above-identified adjustments, control circuitry 545 may suitably use principles of applied mathematical theories, including statistics, stochastic modeling, chaos theory, standard deviation, probability theory, permutations and combinations, frequency, or the like. Further, in deriving the first measurable characteristic, in addition to the use of timers, clocks and the like, any physically sensible characteristic or aspect of the network impacting communication throughput may suitably be used (e.g., communication channel utilization indicia).

Although network interface 500 is used to illustrate one circuit embodiment of the present invention, other circuit configurations may suitably be implemented in other processing systems, nodes, gateways or the like. More particularly, in alternate embodiments, the above-identified circuits and circuitry, as well as microprocessing system 400 of FIG. 4, may suitably be replaced by or combined with programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 6A:
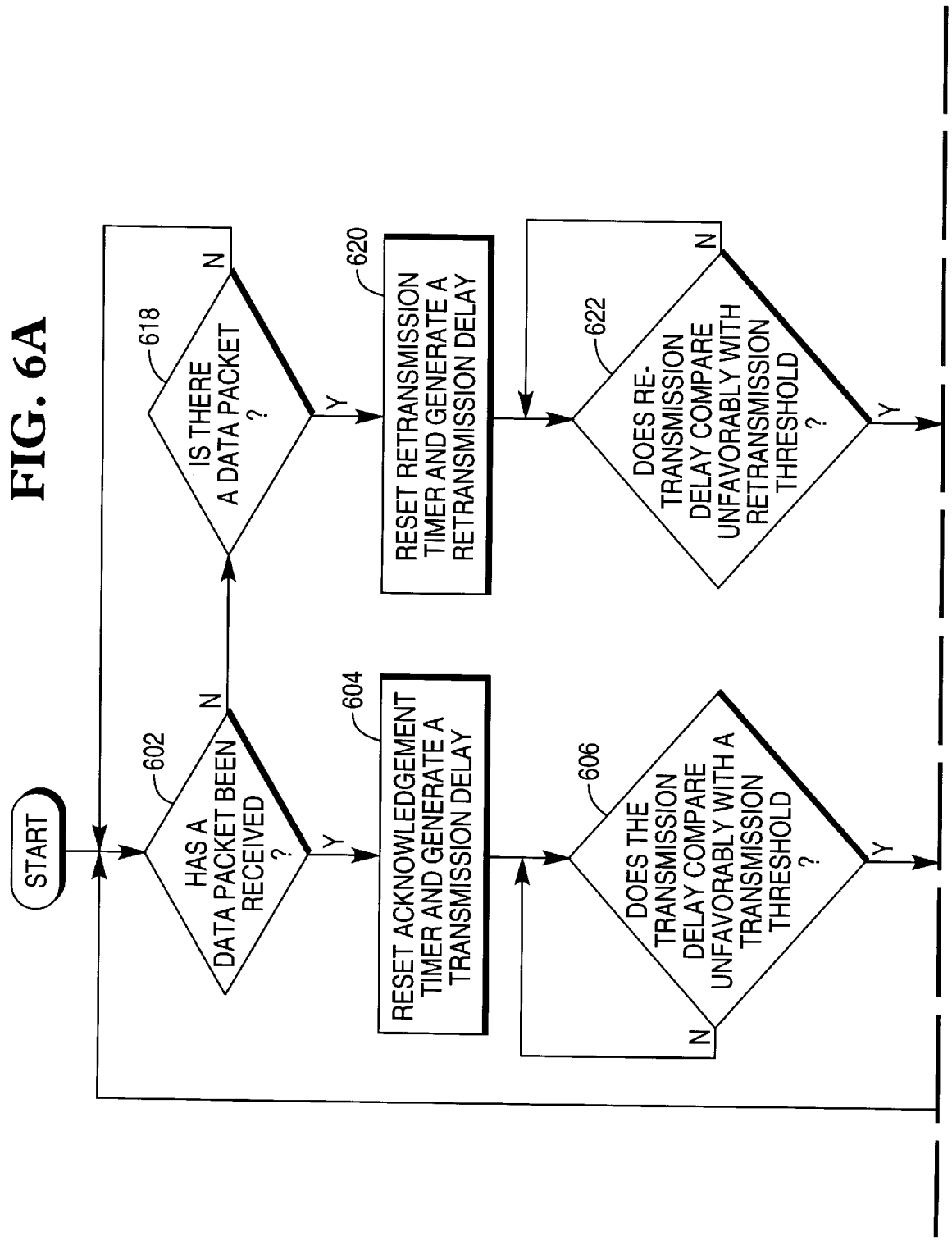

FIGS. 6A and 6B illustrate a flow diagram for performing intelligent acknowledgment-based flow control in accordance with the principles of the present invention. For illustrative purposes only, the discussion of FIG. 6 is made with reference to FIG. 5.

A determination is made as to whether a data packet has been received from a transmission node, gateway or the like (decisional step 602). In the event a data packet was received (YES branch of decisional step 602), an acknowledgment timer is reset and the acknowledgment timer begins generating a transmission delay (process step 604). The transmission delay represents an elapsed time interval with respect to a received data packet. A determination is made as to whether the transmission delay compares unfavorably with a transmission threshold (decision step 606).

In the event that the transmission delay compares unfavorably (YES branch of decisional step 606), then a reception indicia, such as a signal, is returned to the transmission node, gateway or the like (input/output step 608). Detector circuitry 540 is operative to derive the latency characteristic as a function of the comparison (process step 610), and to compare the same with a latency threshold (process step 612), such as a maximum frequency of occurrence, for example. In the event that the latency characteristic compares unfavorably (YES branch of decisional step 614), then control circuitry 545 is operative to adjust or modify the acknowledgment timeout function (e.g., change the timeout threshold, slow the timer or clock, etc.), temporarily disable the same, temporarily disable the acknowledgment requirement, or the like (process step 616), thereby improving the overall efficiency of acknowledgment transference.

In other words, management circuit 510 is operative to monitor the latency characteristic, and to adjust the transmission delay of the transmission of the reception indicia over the network. This is preferably accomplished as a function of the latency characteristic.

In the event a data packet was not received (NO branch of decisional step 602), then a determination is made as to whether a data packet is to be transmitted (decisional step 618). In the event the data packet is to be transmitted (YES branch of decisional step 618), then a retransmission timer is reset and the retransmission timer begins generating a retransmission delay (process step 620). The retransmission delay represents an elapsed time interval with respect to transmission of the data packet without receipt of reception indicia, such as an acknowledgment signal, for example. A determination is made as to whether the retransmission delay compares unfavorably with a retransmission threshold (decision step 622).

In the event that the retransmission delay compares unfavorably (YES branch of decisional step 622), then the data packet is retransmitted over the network (input/output step 624). Detector circuitry 540 is operative to derive the latency characteristic as a function of the comparison (process step 610), and to compare the same with a latency threshold (process step 612), such as a maximum frequency of occurrence, for example. In the event that the latency characteristic compares unfavorably (YES branch of decisional step 614), then control circuitry 545 is operative to adjust or modify the retransmission timeout function (e.g., change the timeout threshold, slow the timer or clock, etc.), temporarily disable the same, temporarily disable the retransmission requirement, or the like (process step 626), thereby improving the overall efficiency of data packet retransmission.

From the foregoing, it is apparent that the present invention dynamically and adaptively improves the efficiency of data packet transference, and provides circuits and methods for intelligent acknowledgment-based flow control in a network. Although the present invention has been illustrated in the context of computer network, the principles of the same may suitably be implemented in any communication network, including wired and wireless implementations. Further, although the present invention and its advantages have been described in detail, those skilled in the art should understand that they can make various changes, substitutions and alterations herein without departing from the spirit and scope of the invention in its broadest form.

What is claimed is:

1. A management circuit for governing transmission of reception indicia by a transmission circuit over a network, comprising:

a detector circuit operative to monitor a latency characteristic indicative, at least in part, of an efficiency level associated with transmission of said reception indicia by said transmission circuit; and a control circuit, associated with said detector circuit and said transmission circuit, operative to adjust a transmission delay of said transmission of said reception indicia over said network as a function of said latency characteristic and a frequency of timeout occurrences to thereby allow said management circuit to manage said transmission delay as a function of said efficiency level associated with said transmission circuit.

2. The management circuit as set forth in claim 1 wherein said management circuit is associated with one of a node and a gateway.

3. The management circuit as set forth in claim 2 wherein said transmission delay represents an elapsed interval with respect to a received data packet.

4. The management circuit as set forth in claim 1 wherein said control circuit is further operative to compare said transmission delay with a threshold.

5. The management circuit as set forth in claim 4 wherein said detector circuit is further operative to derive said latency characteristic as a function of said comparison.

6. The management circuit as set forth in claim 1 wherein said control circuit is further operative to compare said latency characteristic with a threshold.

7. The management circuit as set forth in claim 1 wherein said management circuit is further operative to govern transmission of data packets by a packet transmission circuit over said network, said management circuit further comprising:

detector means for monitoring a second latency characteristic associated with said network and indicative, at least in part, of a utilization level of said network; and retransmission control means for adjusting a retransmission delay of said transmission of said data packets over said network as a function of said second latency characteristic to thereby allow said management circuit to manage said retransmission delay as a function of said utilization level of said network.

8. A management circuit for governing transmission of data packets by a packet transmission circuit over a network, comprising:

a detector circuit, associated with said network, operative to monitor a latency characteristic of said network, said latency characteristic indicative, at least in part, of a utilization level of said network; and a retransmission control circuit, associated with said detector circuit and said packet transmission circuit, operative to adjust a retransmission delay of said transmission of said data packets over said network as a function of said latency characteristic and a frequency of timeout occurrences to thereby allow said management circuit to manage said retransmission delay as a function of said utilization level of said network.

9. The management circuit as set forth in claim 8 wherein said retransmission control circuit is one of disabled in response to a received positive acknowledgment, and operative to enable said packet transmission circuit to retransmit said data packets over said network in response to a negative acknowledgment.

10. The management circuit as set forth in claim 8 wherein said management circuit is associated with one of a node and a gateway.

11. The management circuit as set forth in claim 10 wherein said retransmission delay represents an elapsed interval with respect to a transmitted data packet.

12. The management circuit as set forth in claim 8 wherein said retransmission control circuit is further operative to compare said retransmission delay with a threshold.

13. The management circuit as set forth in claim 12 wherein said detector circuit is further operative to derive said latency characteristic as a function of said comparison.

14. The management circuit as set forth in claim 8 wherein said retransmission control circuit is further operative to compare said latency characteristic with a threshold.

15. The management circuit as set forth in claim 8 wherein said management circuit is further operative to governing transmission of a reception indicia by a transmission circuit over said network, said management circuit further comprising:

detector means for monitoring a second latency characteristic associated, at least in part, with an efficiency level associated with transmission of said reception indicia by said transmission circuit; and control means for adjusting a transmission delay of said transmission of said reception indicia over said network as a function of said second latency characteristic to thereby allow said management circuit to manage said transmission delay as a function of said efficiency level associated with said transmission circuit.

16. A method for governing transmission of a reception indicia by a transmission circuit over a network, comprising the steps of:

monitoring a latency characteristic, said latency characteristic indicative, at least in part, of an efficiency level associated with transmission of said reception indicia by said transmission circuit; and adjusting a transmission delay of said transmission of said reception indicia over said network as a function of said latency characteristic and a frequency of timeout occurrences to thereby manage said transmission delay as a function of said efficiency level associated with said transmission circuit.

17. The method as in claim 16 wherein said transmission delay represents an elapsed interval with respect to a received data packet.

18. The method as set forth in claim 16 further comprising the step of comparing said transmission delay with a threshold.

19. The method as set forth in claim 18 further comprising the step of deriving said latency characteristic as a function of said comparison.

20. The method as set forth in claim 16 further comprising the step of comparing said latency characteristic with a threshold.

21. The method as set forth in claim 16 wherein said method further governs transmission of data packets by a packet transmission circuit over said network, said method further comprising the steps of:

monitoring a second latency characteristic associated with said network and indicative, at least in part, of a utilization level of said network; and adjusting a retransmission delay of said transmission of said data packets over said network as a function of said second latency characteristic to thereby manage said retransmission delay as a function of said utilization level of said network.

22. A method for governing transmission of data packets by a packet transmission circuit over a network, comprising the steps of:

monitoring a latency characteristic of said network, said latency characteristic indicative, at least in part, of a utilization level of said network; and adjusting a retransmission delay of said transmission of said data packets over said network as a function of said latency characteristic and a frequency of timeout occurrences to thereby manage said retransmission delay as a function of said utilization level of said network.

23. The method as set forth in claim 22 further comprising the steps of:

disabling said packet transmission circuit in response to a received positive acknowledgment; and enabling said packet transmission circuit to retransmit said data packets over said network in response to a negative acknowledgment.

24. The method as set forth in claim 22 said retransmission delay represents an elapsed interval with respect to a transmitted data packet.

25. The method as set forth in claim 22 further including the step of comparing said retransmission delay with a threshold.

26. The method circuit as set forth in claim 25 further including the step of deriving said latency characteristic as a function of said comparison.

27. The method as set forth in claim 22 further including the step of comparing said latency characteristic with a threshold.

28. The method as set forth in claim 22 wherein said method further governs transmission of a reception indicia by a transmission circuit over said network, said method further comprising the steps of:

monitoring a second latency characteristic associated, at least in part, with an efficiency level associated with transmission of said reception indicia by said transmission circuit; and adjusting a transmission delay of said transmission of said reception indicia over said network as a function of said second latency characteristic to thereby manage said transmission delay as a function of said efficiency level associated with said transmission circuit.

29. A management circuit for governing transmission of data packets and a reception indicia by a transmission circuit over a network, comprising:

detector circuitry operative to:

monitor a first latency characteristic of said network, said latency characteristic indicative, at least in part, of a utilization level of said network; and monitor a second latency characteristic indicative, at least in part, of an efficiency level associated with transmission of said reception indicia by said transmission circuit; and control circuit, associated with said detector circuitry and said transmission circuit, operative to:

adjust a retransmission delay of said transmission circuit of said data packets over said network as a function of said first latency characteristic and a frequency of transmission timeout occurrences to thereby allow said management circuit to manage said retransmission delay as a function of said utilization level of said network; and adjust a transmission delay of said transmission circuit of said reception indicia over said network as a function of said second latency characteristic and a frequency of acknowledgment timeout occurrences to thereby allow said management circuit to manage said transmission delay as a function of said efficiency level associated with said transmission circuit.

* * * * *